United States Patent [19]

Röber et al.

[11] Patent Number: 5,449,024
[45] Date of Patent: * Sep. 12, 1995

[54] MULTILAYER PLASTIC PIPE

[75] Inventors: Stefan Röber; Roland Feinauer; Hans-Dieter Herrmann; Hans Jadamus, all of Marl; Joachim Mügge, Haltern; Hans Ries, Marl, all of Germany

[73] Assignee: Huels Aktiengesellschaft, Marl, Germany

[*] Notice: The portion of the term of this patent subsequent to May 24, 2011 has been disclaimed.

[21] Appl. No.: 160,904

[22] Filed: Dec. 3, 1993

[30] Foreign Application Priority Data

Dec. 3, 1992 [DE] Germany ............ 42 40 658.7

[51] Int. Cl.$^6$ ............................................. F16L 9/14
[52] U.S. Cl. ............................ 138/137; 138/DIG. 7
[58] Field of Search ............ 138/137, 140, 126, 125, 138/141

[56] References Cited

U.S. PATENT DOCUMENTS

| | | | |
|---|---|---|---|
| 4,410,661 | 10/1983 | Epstein et al. | 138/137 |
| 4,762,589 | 8/1988 | Akiyama et al. | 138/137 |
| 4,802,938 | 2/1989 | Kitami et al. | 138/141 |
| 4,968,545 | 11/1990 | Fellman et al. | 138/137 |
| 4,998,565 | 3/1991 | Kokuryu et al. | 138/126 |
| 5,038,833 | 8/1991 | Brunnhofer | 138/137 |
| 5,076,329 | 12/1991 | Brunnhofer | 138/140 |
| 5,236,765 | 8/1993 | Cordia et al. | 138/156 |
| 5,258,213 | 11/1993 | Mügge et al. | . |
| 5,313,987 | 5/1994 | Röber et al. | 138/137 |
| 5,362,529 | 11/1994 | Mügge et al. | 428/35.7 |
| 5,362,530 | 11/1994 | Kitami et al. | 138/126 |

FOREIGN PATENT DOCUMENTS

| | | |
|---|---|---|
| 2549227 | 5/1976 | Germany . |
| 3827092 | 9/1989 | Germany . |
| 4001125 | 12/1990 | Germany . |

Primary Examiner—Timothy F. Simone
Assistant Examiner—James F. Hook
Attorney, Agent, or Firm—Oblon, Spivak, McClelland, Maier & Neustadt

[57] ABSTRACT

Multilayer plastic pipe comprising at least one outer layer based on polyamide and at least one layer of a linear, crystalline polyester modified by means of an isocyanate mixture exhibits improved resistance, inter alia, to methanol-containing fuels and improved mechanical properties.

25 Claims, 1 Drawing Sheet

LAYER I
POLYAMIDE

LAYER II
MIXTURE OF THERMOPLASTIC
POLYESTER AND A MIXTURE
OF ISOCYANATE COMPOUNDS

MULTILAYER PLASTIC PIPE

BACKGROUND OF THE INVENTION

1. Field of the Invention

The present invention relates to multilayer plastic composites, multilayer plastic pipe, and various articles comprising such multilayer plastic composites.

2. Discussion of the Background

Plastic pipes made from polyamide are known and are employed for a variety of applications. In order to achieve their objective, the pipes must be, inter alia, inert to the medium flowing in them and must be resistant to high and low temperatures and mechanical stresses.

Single-layer pipes are not always capable of satisfying the necessary requirements. In the case of transport of, for example, aliphatic or aromatic solvents, fuels or the like, they exhibit considerable disadvantages, such as a poor retention of the medium being transported, undesired changes in dimension, or inadequate resistance to mechanical stresses.

It has been attempted to overcome these disadvantages by means of multilayer pipes (DE-A 35 10 395, 37 15 251, 38 21 723, 40 01 125, and 40 01 126). However, practical implementation of these proposals has shown that, although some disadvantages can be overcome, the overall property profile is still unsatisfactory.

German Patent 38 27 092 describes a multilayer plastic pipe which contains, from the inside outwards, layers of polyamide, polyvinyl alcohol, polyamide and polyester. The polyester here is only employed in a thin outer layer in order to allow relatively high short-term heat resistance to be achieved. It is known to persons skilled in the art that by far the majority of polymers, including polyamides and polyesters, are incompatible with one another, which is why no adhesion is achieved between the laminate layers in the production of multilayer composites. However, an adhesion-based bond between the individual polymer layers is absolutely essential in industrial applications.

In particular, permeation of methanol-containing fuels has only been reduced to an inadequate extent by means of the above-mentioned proposals. Reduction in permeation by using novel intermediate layers is therefore of crucial importance, because, in particular, the legally permitted emission values are constantly being reduced.

Thus, there remains a need for a multilayer plastic composite which is a good barrier to the transported or contained medium, in particular to methanol-containing fuels, and which exhibits satisfactory dimensional stability and satisfactory resistance to mechanical stresses. In particular, there remains a need for a multilayer plastic pipe which is a good barrier to the transported medium, in particular to methanol-containing fuels, and which exhibits satisfactory dimensional stability and satisfactory resistance to mechanical stresses.

SUMMARY OF THE INVENTION

Accordingly, it is one object of the present invention to provide a novel multilayer plastic composite.

It is another object of the present invention to provide a multilayer plastic composite which is a good barrier to a transported or contained medium, such as aliphatic and aromatic solvents and methanol-containing fuels.

It is another object of the present invention to provide a multilayer plastic composite which exhibits good dimensional stability.

It is another object of the present invention to provide a multilayer plastic composite which exhibits good resistance to mechanical stress.

It is another object of the present invention to provide a novel multilayer plastic pipe.

It is another object of the present invention to provide multilayer plastic pipe which is a good barrier to transported materials.

It is another object of the present invention to provide multilayer plastic pipe which is a good barrier to methanol-containing fuels.

It is another object of the present invention to provide multilayer plastic pipe which exhibits good dimensional stability.

It is another object of the present invention to provide multilayer plastic pipe which exhibits good resistance to mechanical stress.

It is another object of the present invention to provide articles comprising such a multilayer plastic composite.

It is another object of the present invention to provide brake fluid lines, cooling fluid lines, hydraulic fluid lines and fuel lines comprising such multilayer plastic pipe.

It is another object of the present invention to provide hollow articles comprising such a multilayer plastic composite.

It is another object of the present invention to provide filling nozzles and fuel tanks comprising such a multilayer plastic composite.

These and other objects, which will become apparent during the following detailed description, have been achieved by the inventors' discovery that a multilayer plastic composite which comprises:

(I) at least one outer layer based on a polyamide molding composition; and
(II) at least one layer of a molding composition based on a mixture of:
  (a) from 99 to 95% by weight of a linear, partially crystalline polyester; and
  (b) from 1 to 5% by weight of a mixture of:
    (1) from 30 to 70% by weight of at least one compound containing two isocyanate groups; and
    (2) from 30 to 70% by weight of at least one compound containing more than two isocyanate groups, where the isocyanate groups originating from component (IIb) are present in component (II) in a concentration of between 0.03 and 0.3% by weight, and the layers (I) and (II) are adhesively bonded to one another; are good barriers, in particular for methanol-containing fuels, and exhibit good dimensional stability and resistance to mechanical stress.

DETAILED DESCRIPTION OF THE PREFERRED EMBODIMENTS

Figure 1:
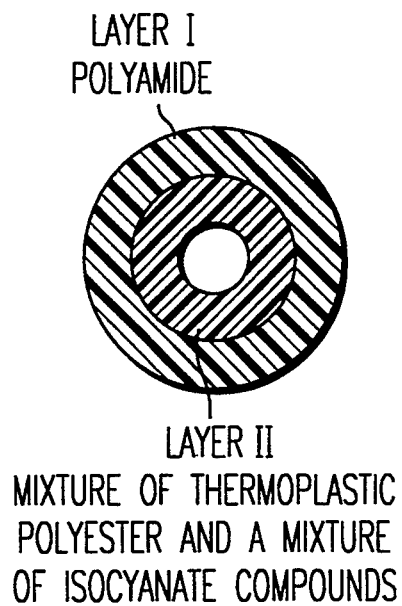
FIG. 1 shows a multilayer plastic pipe according to the present invention.
Figure 2:
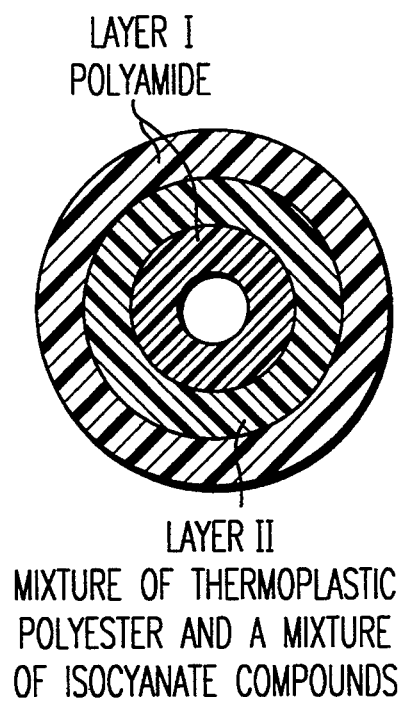
FIG. 2 shows a preferred embodiment of the invention multilayer plastic pipe.

The layer (II) comprises from 99 to 95% by weight, preferably from 98 to 96% by weight, of component (IIa) and from 1 to 5% by weight, preferably from 2 to 4% by weight, of component (IIb), in which the amounts of (IIa) and (IIb) are based on the total weight of layer (II).

Component (IIb) comprises a mixture of from 30 to 70% by weight, preferably from 40 to 60% by weight, of at least one compound containing two isocyanate groups (IIb1) and from 30 to 70% by weight, preferably from 40 to 60% by weight, of at least one compound containing more than two isocyanate groups (IIb2), in which the amounts of components (IIb1) and (IIb2) are based on the total weight of component (IIb).

The isocyanate groups originating from component (IIb) are present in component (II) in a concentration of between 0.03 and 0.3% by weight, preferably between 0.06 and 0.25% by weight, based on the total weight of component (II).

Suitable polyamides for layer (I) are primarily aliphatic homo- and copolycondensates. Examples which may be mentioned are polyamides (nylons) 4,6; 6,6; 6,12; 8,10; and 10,10. Preference is given to polyamides 6; 10,12; 11; 12; and 12,12. [The numbering of the polyamides corresponds to the international standard, the first number(s) indicating the number of carbon atoms in the starting diamine and the final number(s) indicating the number of carbon atoms in the dicarboxylic acid. If only one number is given, the starting material was an α,ω-aminocarboxylic acid or the lactam derived therefrom (H. Domininghaus, *Die Kunststoffe und ihre Eigenschaften* [Plastics and their Properties], page 272, VDI-Verlag (1976)).]

If copolyamides are used, these can contain, for example, adipic acid, sebacic acid, suberic acid, isophthalic acid or terephthalic acid as the co-acid and bis(4'-aminocyclohexyl)methane, trimethylhexamethylenediamine, hexamethylenediamine or the like as the co-diamine.

The preparation of these polyamides is known (for example, see: D. B. Jacobs, J. Zimmermann, *Polymerization Processes*, pp. 424–67; Interscience Publishers, New York (1977); and DE-B 21 52 194).

Other suitable polyamides are mixed aliphatic-/aromatic polycondensates, as described, for example, in U.S. Pat. Nos. 2,071,250; 2,071,251; 2,130,523; 2,130,948; 2,241,322; 2,312,966; 2,512,606; and 3,393,210, and in Kirk-Othmer, *Encyclopedia of Chemical Technology*, 3rd Edn., Vol. 18, pages 328 and 435, Wiley & Sons (1982). Other polycondensates which are suitable as polyamides are poly(ether ester amides) and poly(ether amides). Products of this type are described, for example, in DE-A 27 12 987, 25 23 991, and 30 06 961.

The molecular weight (number average) of the polyamides is greater than 5,000, preferably greater than 10,000, corresponding to a relative viscosity ($\eta_{rel}$) in the range from 1.5 to 2.8.

In a preferred embodiment, the polyamides used for component (I) are those in which at least 50% of all the terminal groups are amino groups.

The polyamides mentioned may be employed alone or in mixtures.

The linear, partially crystalline polyesters, component (IIa), have the following basic formula (III):

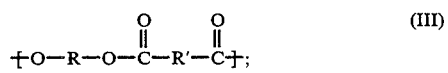
(III)

where R is a divalent, branched or unbranched, aliphatic and/or cycloaliphatic radical having 2 to 12, preferably 2 to 8, carbon atoms in the carbon chain, and R' is a divalent aromatic radical having 6 to 20, preferably 8 to 12, carbon atoms in the carbon structure. Such polyesters may be prepared by condensing a diol with an aromatic dicarboxylic acid.

Examples which may be mentioned of the diols which may be used as a monomer for the polymer of formula (III) are ethylene glycol, trimethylene glycol, tetramethylene glycol, hexamethylene glycol, neopentyl glycol, cyclohexanedimethanol, and the like.

Up to 25 mol % of the diol mentioned may be replaced by a second diol already mentioned above or by a diol of the following general formula (IV):

(IV)

where R" is a divalent radical having 2 to 4 carbon atoms, and x can have a value of from 2 to 50.

Preferred diols are ethylene glycol and, in particular, tetramethylene glycol.

Examples of aromatic dicarboxylic acids suitable for use as a monomer for the polymer of formula (III) are terephthalic acid, isophthalic acid, 1,4-, 1,5-, 2,6- and 2,7-naphthalenedicarboxylic acid, diphenic acid, and diphenyl ether 4,4'-dicarboxylic acid. Terephthalic acid is preferred.

Up to 20 mol % of these dicarboxylic acids may be replaced by aliphatic dicarboxylic acids, such as, for example, succinic acid, maleic acid, fumaric acid, sebacic acid, dodecanedioic acid, inter alia.

The preparation of the linear, partially crystalline polyesters may be carried out by conventional methods (see, e.g., DE-A 24 07 155 and 24 07 156; *Ullmanns Encyclopadie der technischen Chemie* [Ullmann's Encyclopedia of Industrial Chemistry], 4th Edn., Vol. 19, pages 65 ff., Verlag Chemie GmbH, Weinheim, 1980).

The polyesters employed according to the present invention have a viscosity index (J value) in the range from 80 to 240 cm³/g, preferably 100 to 200 cm³/g, as measured by DIN 53 728/ISO 1628/5-Part 5. The partially crystalline polyester (IIa) of the present invention suitably has a crystallinity of 15 to 40%, preferably 25 to 35%.

The polyamides of the outer layer (I) and/or the linear, partially crystalline polyesters, component (IIa) may contain another thermoplastic in an amount up to 40% by weight, based on the total weight of the layer in which the other thermoplastic is present, so long as the latter do not adversely affect the bonding ability of component (I) to component (II). Particular mention may be made here of polycarbonate (H. Schnell, *Chemistry and Physics of Polycarbonates*, Interscience Publishers, New York (1981)), acrylonitrile-styrene-butadiene copolymers (Houben-Weyl, *Methoden der organischen Chemie* [Methods of Organic Chemistry], Vol. 14/1, Georg Thieme Verlag Stuttgart, pp. 393–406; *Ullmanns Encyclopadie der technischen Chemie* [Ullmann's Encyclopedia of Industrial Chemistry], 4th Edition, Vol. 19, Verlag Chemie, Weinheim (1981), pp. 279–284), acrylonitrile-styrene-acrylate copolymers (*Ullmanns Encyclopadie der technischen Chemie* [Ullmann's Encyclopedia of Industrial Chemistry], 4th Edition, Vol. 19, Verlag Chemie, Weinheim (1981), pp. 277–295), acrylonitrile-styrene copolymers (*Ullmanns Encyclopadie der technischen Chemie* [Ullmann's Encyclopedia of

*Industrial Chemistry*], 4th Edition, Vol. 19, Verlag Chemie, Weinheim (1981) pp. 273 ff.) or polyphenylene ethers (DE-A 32 24 691 and 32 24 692, and U.S. Pat. Nos. 3,306,874; 3,306,875; and 4,028,341) as the other thermoplastics which may be present in either or both of components (I) and (II) in amounts up to 40% by weight so long as the bonding between components (I) and (II) is not adversely affected.

If necessary, the polyamides and/or polyesters can be impact-modified. Examples of suitable polymers for this purpose are ethylene-propylene or ethylene-propylene-diene copolymers (EP-A-295 076), polypentenylene, polyoctenylene or random or block copolymers made from alkenyl-aromatic compounds with aliphatic olefins or dienes (EP-A-261 748). Mention may furthermore be made of impact-modifying rubbers: core/shell rubbers having a tough, resilient core of (meth)acrylate, butadiene or styrene-butadiene rubber having glass transition temperatures, $T_g$, of $< -10°$ C., where the core may be crosslinked. The shell can be built up from styrene and/or methyl methacrylate and/or further unsaturated monomers (DE-A 21 44 528 and 37 28 685). The proportion of impact-modifying component should be selected so that the desired properties are not impaired.

As component (IIb1), compounds are employed which contain two isocyanate groups. Suitable such compounds are, in particular, aromatic and (cyclo)aliphatic isocyanates, such as, for example, 1,4-phenylene diisocyanate, 2,4-tolylene diisocyanate, 2,6-tolylene diisocyanate, 1,5-naphthylene diisocyanate, 1,6-hexamethylene diisocyanate, diphenylmethane 2,4-diisocyanate, diphenylmethane 4,4'diisocyanate, diphenylmethane 2,2'-diisocyanate, isophorone diisocyanate, 1,4-tetramethylene diisocyanate, and 1,12-dodecane diisocyanate. Further examples are cyclohexane 1,3-diisocyanate, cyclohexane 1,4-diisocyanate, cyclobutane 1,3-diisocyanate, 2,4-hexahydrotolylene diisocyanate, 2,6-hexahydrotolylene diisocyanate, norbornane diisocyanate, p- and m-xylylene diisocyanates, perhydro-2,4-diphenylmethane diisocyanate, and perhydro-4,4'-diphenylmethane diisocyanate.

Compounds which have proven particularly advantageous as component (IIb1) are isophorone diisocyanate and products of the reaction thereof with itself and with suitable reactants, such as, for example, $\alpha,\omega$-diols having 2-10 carbon atoms in the carbon chain.

Preferred reaction products are obtained, for example, from the reaction of at least two molecules of isophorone diisocyanate, the binding taking place by reaction of in each case two isocyanate groups with formation of a biuret group.

Other preferred reaction products are obtained, for example, by reaction of, in each case, two isophorone diisocyanate molecules with one molecule of diol, in each case one isocyanate group of the isophorone diisocyanate forming a urethane bond with one of the hydroxyl groups of the diol. Examples of particularly suitable diols for the formation of this product are butanediol and diethylene glycol.

As component (IIb2), compounds are employed which contain more than two and preferably precisely three isocyanate groups. Suitable such compounds are, for example, triphenylmethane 4,4',4''-triisocyanate, furthermore products of the reaction of the diisocyanates listed above in respect of component (IIb1), in particular triisocyanurates of these diisocyanates, such as, for example, the triisocyanurate formed on reaction of, in each case, three molecules of hexamethylene diisocyanate. Particular preference is given to the triisocyanate formed on reaction of in each case three molecules of isophorone diisocyanate.

The isocyanate groups of components (IIb1) and (IIb2) may be in blocked form. The blocking of isocyanate groups is known (for example, see: *Paint Resin*, vol. 58 (1988) 5, 18–19). For example, mention may be made of blocking by reaction of the isocyanate groups with diols, pyrazoles, oximes, in particular ketoximes, and lactams, in particular caprolactam.

The molding compositions for the layers (I) and (II) may contain conventional auxiliaries and additives, such as, for example, flameproofing agents, stabilizers, plasticizers, processing auxiliaries, viscosity improvers, fillers, in particular those for improving the conductivity, pigmentation and the like. The amount of said agents should be adjusted so that the desired properties are not seriously affected.

The molding composition for layer (II) may be prepared by conventional and known processes by mixing the melts of components (IIa) and (IIb) in a mixer which provides good compounding, such as, for example, a twin-screw extruder, at temperatures which depend on the melting points of components (IIa) and (IIb), in general at temperatures between 200° and 300° C.

The preparation of the molding composition for layer (II) may be carried out using catalysts which are conventional and known in the processing of isocyanates.

Before the production of the multilayer pipes, the molding composition for layer (II) should be stored under dry conditions with exclusion of atmospheric moisture.

The above-described preparation of the molding composition for layer (II) can also be carried out directly in a feed extruder of the coextrusion or injection-molding line used for the production of the present multilayer composites or pipes, so that the molding composition for layer (II) can be converted directly after its production—without further interim storage—into a layer of the multilayer composite or pipe. In the case of coextrusion, the processing conditions in the production of the multilayer pipes should be selected so that the melts are laid on one another at a sufficiently high pressure.

The multilayer composites and pipes of the present invention may be produced in a known manner, for example as described in the above-cited references. In particular, the present multilayer plastic composites and pipes are preferably prepared by coextrusion or injection molding. Suitably, the coextrusion or injection molding is carried out at temperatures ranging from 200° to 300° C. and such that layers (I) and (II) are combined at a pressure of 100 to 400 bar, preferably 150 to 300 bar. Such a process results in an adhesive/non-positive bond between layers (I) and (II). Two parts (in this case layers) are connected to one another in a non-positive manner if a force which is applied to one of the parts can be transferred to the other part rigidly connected to it, without any problems.

The multilayer composites and pipes according to the present invention have extremely good resistance and are a good barrier to the diffusion of (petro)chemical substances, solvents and fuels. Furthermore, there is a non-postive bond between the two layers, so that delamination of the various layers from one another does not occur, for example on thermal expansion or flexing of the pipe. In addition, it is also possible to produce, in addition to a two-layer composite or pipe, composites or pipes of other types which comprise, for example, three or more layers by additionally incorporating further layers of (I) and/or (II).

In a preferred embodiment, the multilayer composites and pipes have a three-layer structure: component I/component II/component I.

Although there is no particular limitation on the thickness of either of layers (I) or (II) in the present multilayer composites and pipes, the thickness of each of layers (I) and (II) is typically 0.1 mm to 1 mm. For example, in a multilayer pipe having an external diameter of 8 mm and an overall wall thickness of 1 mm, the layer thicknesses can be, for example, from the inside outwards, 0.2 mm of component (I), 0.2 mm of component (II), and 0.6 mm of component (I). Other layer-thickness distributions are also conceivable according to the invention, for example with a relatively thick central layer of, for example, 0.4 mm of component (II).

The plastic pipes according to the present invention are preferably employed for the transport of (petro)-chemical substances or in the motor transport sector for carrying brake, cooling, and hydraulic fluids and fuel. A further use of the multilayer pipes is for the production of hollow articles, such as fuel tanks or filling nozzles, in particular for the motor vehicle sector.

Other features of the invention will become apparent in the course of the following descriptions of exemplary embodiments which are given for illustration of the invention and are not intended to be limiting thereof.

EXAMPLES

The results shown in the examples were determined using the measurement methods described below.

The determination of the solution viscosity (relative viscosity $\eta_{rel}$) of the polyamides is carried out using a 0.5% strength by weight m-cresol solution at 25° C. in accordance with DIN 53 727/ISO 307.

For the determination of the amino terminal groups, 1 g of the polyamide is dissolved in 50 ml of m-cresol at 25° C. The solution is titrated potentiometrically with perchloric acid.

For the determination of the carboxyl terminal groups in the polyamide, 1 g of polycondensate is dissolved in 50 ml of benzyl alcohol under a nitrogen blanket at 165° C. The dissolution time is a maximum of 20 minutes. The solution is titrated with a solution of KOH in ethylene glycol (0.05 mol of KOH/l) against phenolphthalein until the color changes.

The determination of the solution viscosity (viscosity index J) of the polyesters is carried out in a 0.5% strength by weight phenol/o-dichlorobenzene solution (weight ratio 1:1) at 25° in accordance with DIN 53 728/ISO 1628/5 - Part 5.

For the determination of the isocyanate groups, 6 g of component (II) (polyester, isocyanate) are dissolved at 180° C. in a mixture of dichlorobenzene/dibutylamine (80:20% by volume). The solution is titrated at 20° C. with 10% strength hydrochloric acid against bromophenol as indicator (DIN 53 185).

The testing of the ease of mechanical separation at the interface is carried out using a metal wedge (edge angle: 5 degrees; loading weight: 2.5 kg); in this test, it is attempted to separate the material interface layer to be tested. If separation takes place at the interface between the components, the adhesion is poor. If, by contrast, the separation takes place wholly or partly within one of the two components, good adhesion is present.

The determination of the diffusion of fuel components is carried out on pipes using a fuel mixture (fuel M15: 42.5 parts by volume of isooctane, 42.5 parts by volume of toluene and 15 parts by volume of methanol) at 23° C. and 50% atmospheric humidity. The samples, having a length of 200 mm, are filled with the fuel mixture and are connected to a filled stock tank during the measurement. Diffusion is determined as the loss in weight by diffusion over time (measurement every 24 hours). The unit indicated is the weight loss recorded per unit area, measured when the diffusion process has achieved equilibrium, i.e. when the weight loss determined per 24 hours no longer changes with time.

Examples denoted by letters are comparative examples not according to the invention.

EXAMPLES

A. Component I.

PA 1: Polyamide 12 ($\eta_{rel}$: 2.1; 86.2% of the terminal groups are amino groups; 50 mmol/kg of amino terminal groups; 8 mmol/kg of carboxyl terminal groups)

PA 2: Polyamide 12 ($\eta_{rel}$: 2.0; 86.2% of the terminal groups are amino groups; 50 mmol/kg of amino terminal groups; 8 mmol/kg of carboxyl terminal groups; modified by means of 15% by weight of commercially available plasticizer)

B. Component II.

Z 1: Homopolybutylene terephthalate (J value: 165 cm$^3$/g; VESTODUR ® 3000 - HÜLS AG; NCO content=0)

Z 2: Homopolybutylene terephthalate (J value: 145 cm$^3$/g; VESTODUR ® 2000 - HÜLS AG; NCO content=0)

Z 3: Homopolybutylene terephthalate (J value: 115 cm$^3$/g VESTODUR ® 1000 - HÜLS AG; NCO content=0)

Z 4: Homopolyethylene terephthalate (POLYCLEAR ® TR 86 - HOECHST AG; NCO content=0)

Z 5: Mixture of:
a. 98% by weight of homopolybutylene terephthalate (J value 115 cm$^3$/g; VESTODUR ® 1000 - HÜLS AG); and
b. 2% by weight of a mixture comprising:
b.1. 50% by weight of a compound prepared from 2 mol of isophorone diisocyanate and 1 mol of diethylene glycol, the bonding in each case taking place via a urethane bond and the remaining NCO groups being blocked by capro-lactam; and
b.2. 50% by weight of isocyanurate of isophorone diisocyanate (VESTANAT ® T 1890 - HÜLS AG). NCO group concentration in component (II) Z 5: 0.08% by weight.

Z 6: Mixture of:
a. 96% by weight of homopolybutylene terephthalate (J value 115 cm$^3$/g; VESTODUR ® 1000 - HÜLS AG); and
b. 4% by weight of a mixture comprising:
b.1. 50% by weight of a compound prepared from 2 mol of isophorone diisocyanate and 1 mol of diethylene glycol, the bonding in each case taking place via a urethane bond and the remaining NCO groups being blocked by caprolactam,; and
b.2. 50% by weight of isocyanurate of isophorone diisocyanate (VESTANAT ® T 1890 - HÜLS AG). NCO group concentration in component (II) Z 6: 0.16% by weight.

Z 7: Mixture of:
  a. 98% by weight of homopolybutylene terephthalate (J value 115 cm³/g; VESTODUR ® 1000 - HÜLS AG); and
  b. 2% by weight of a mixture comprising:
    b.1. 50% by weight of a uretdione built up from in each case two molecules of isophorone diisocyanate, the remaining NCO groups being blocked by caprolactam; and
    b.2. 50% by weight of isocyanurate of isophorone diisocyanate (VESTANAT ® T 1890 - HÜLS AG). NCO group concentration in component (II) Z 7: 0.10% by weight.

Z 8: Mixture of:
  a. 97% by weight of homopolybutylene terephthalate (J value 115 cm³/g; VESTODUR ® 1000 - HÜLS AG); and
  b. 3% by weight of a mixture comprising:
    b.1. 40% by weight of caprolactam-blocked isophorone diisocyanate; and
    b.2. 60% by weight of isocyanurate of isophorone diisocyanate, where the remaining NCO groups are blocked by caprolactam. NCO group concentration in component (II) Z8: 0.15% by weight.

Z 9: Mixture of:
  a. 97% by weight of homopolybutylene terephthalate (J value 115 cm³/g; VESTODUR ® 1000 - HÜLS AG); and
  b. 3% by weight of a mixture comprising:
    b.1. 30% by weight of a compound prepared from 2 mol of isophorone diisocyanate and 1 mol of butanediol, the bonding in each case taking place via a urethane bond and the remaining NCO groups being blocked by caprolactam; and
    b.2. 70% by weight of isocyanurate of isophorone diisocyanate (VESTANAT ® T 1890 - HÜLS AG). NCO group concentration in component (II) Z 9: 0.21% by weight.

C. Production of the multilayer pipes

The pipes were produced on a bench extrusion line using a five-layer die (in the production of the three-layer pipes, 2 channels remain closed). The barrel temperatures were 220° C. (PA 2), 230° C. (PA 1); 250° C. (Z 1; Z 2; Z 3; Z 4; Z 5; Z 6; Z 7; Z 8; and Z 9). The melt pressure measured at the end of the compounding extruder was greater than 160 bar for all the molding compositions. The layer thicknesses were, from the inside outwards: 0.2 mm; 0.2 mm; 0.6 mm.

TABLE

| Experiment | Inner layer | Intermediate layer | Outer layer | Diffusion [g/d.m²] | Mechanically separable at interface at 23° C. after storage in fuel* |
|---|---|---|---|---|---|
| A | PA 1 | Z 1 | PA 1 | <4 | yes yes |
| B | PA 2 | Z 2 | PA 2 | <4 | yes yes |
| C | PA 2 | Z 4 | PA 2 | **) | yes yes |
| D | PA 2 | PA 2 | PA 2 | 100 | no no |
| E | PA 1 | PA 1 | PA 1 | 30 | no no |
| F | PA 1 | Z 3 | PA 1 | <4 | yes yes |
| 1 | PA 1 | Z 5 | PA 1 | <4 | no no |
| 2 | PA 2 | Z 5 | PA 2 | <4 | no no |
| 3 | PA 1 | Z 6 | PA 1 | <4 | no no |
| 4 | PA 2 | Z 6 | PA 2 | <4 | no no |
| 5 | PA 1 | Z 7 | PA 1 | <4 | no no |
| 6 | PA 1 | Z 8 | PA 1 | <4 | no no |
| 7 | PA 2 | Z 9 | PA 2 | <4 | no no |

*) Storage at 23° C. for 5 days in standard fuel M 15 (42.5 parts by volume of isooctane, 42.5 parts by volume of toluene and 15 parts by volume of methanol.
**) Not determined.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A multilayer plastic pipe, which comprises:
   (I) at least one outer layer based on a polyamide molding composition; and
   (II) at least one layer of a molding composition, comprising:
     (a) from 95 to 99% by weight of a linear, partially crystalline thermoplastic polyester; and
     (b) from 1 to 5% by weight of a mixture, comprising:
       (1) from 30 to 70% by weight of at least one compound containing two isocyanate groups; and
       (2) from 30 to 70% by weight of at least one compound containing more than two isocyanate groups;
   wherein the isocyanate groups originating from component (IIb) are present in layer (II) in a concentration of between 0.03 and 0.3% by weight, and said layers (I) and (II) are adhesively bonded to one another.

2. The multilayer plastic pipe according to claim 1, wherein at least 50% of all terminal groups present in said polyamide of layer (I) are amino groups.

3. The multilayer plastic pipe according to claim 1, wherein said layer (II) is a molding composition, comprising:
   (a) from 96 to 98% by weight of a linear partially crystalline polyester; and
   (b) from 2 to 4 % by weight of a mixture of said compound containing two isocyanate groups (IIb1) and said compound containing more than two isocyanate groups (IIb2).

4. The multilayer plastic pipe according to claim 1, wherein said mixture (IIb) comprises:
   (1) from 40 to 60% by weight of at least one compound containing two isocyanate groups; and
   (2) from 40 to 60% by weight of at least one compound containing more than two isocyanate groups.

5. The multilayer plastic pipe according to claim 1, wherein said isocyanate groups originating from component (IIb) are present in said layer (II) in a concentration of between 0.06 and 0.25% by weight.

6. The multilayer plastic pipe according to claim 1, wherein said compound containing two isocyanate groups (IIb1) is (i) isophorone diisocyanate, (ii) a compound prepared by reacting isophorone diisocyanate with itself, or (iii) a compound prepared by reacting isophorone diisocyanate with a diol.

7. The multilayer plastic pipe according to claim 1, wherein said compound containing more than two isocyanate groups (IIb2) is an isocyanurate derived from isophorone diisocyanate.

8. The multilayer plastic pipe according to claim 1, wherein said compound containing two isocyanate groups (IIb1) comprises a lactam-blocked isocyanate.

9. The multilayer plastic pipe according to claim 1, wherein said compound containing more than two isocyanate groups (IIb2) comprises a lactam-blocked isocyanate.

10. The multilayer plastic pipe according to claim 1, comprising a plurality of said layer (I).

11. The multilayer plastic pipe according to claim 1, comprising a plurality of said layers (II).

12. The multilayer plastic pipe of claim 1, which is a brake fluid line, a cooling fluid line, a hydraulic fluid line, or a fuel line for a motor vehicle.

13. A multilayer plastic composite, which comprises:
   (I) at least one outer layer based on a polyamide molding composition; and
   (II) at least one layer of a molding composition, comprising:
      (a) from 95 to 99% by weight of a linear, partially crystalline thermoplastic polyester; and
      (b) from 1 to 5% by weight of a mixture, comprising:
         (1) from 30 to 70% by weight of at least one compound containing two isocyanate groups; and
         (2) from 30 to 70% by weight of at least one compound containing more than two isocyanate groups;
wherein the isocyanate groups originating from component (IIb) are present in layer (II) in a concentration of between 0.03 and 0.3% by weight, and said layers (I) and (II) are adhesively bonded to one another.

14. The multilayer plastic composite according to claim 13, wherein at least 50% of all terminal groups present in said polyamide of layer (I) are amino groups.

15. The multilayer plastic composite according to claim 13, wherein said layer (II) is a molding composition, comprising:
   (a) from 96 to 98% by weight of a linear partially crystalline polyester; and
   (b) from 2 to 4% by weight of a mixture of said compound containing two isocyanate groups (IIb1) and said compound containing more than isocyanate groups (IIb2).

16. The multilayer plastic composite according to claim 13, wherein said mixture (IIb) comprises:

(1) from 40 to 60% by weight of at least one compound containing two isocyanate groups; and
   (2) from 40 to 60% by weight of at least one compound containing more than two isocyanate groups.

17. The multilayer plastic composite according to claim 13, wherein said isocyanate groups originating from component (IIb) are present in said layer (II) in a concentration of between 0.06 and 0.25% by weight.

18. The multilayer plastic composite according to claim 13, wherein said compound containing two isocyanate groups (IIb1) is (i) isophorone diisocyanate, (ii) a compound prepared by reacting isophorane diisocyanate with itself, or (iii) a compound prepared by reacting isophorone diisocyanate with a diol.

19. The multilayer plastic composite according to claim 13, wherein said compound containing more than two isocyanate groups (IIb2) is an isocyanurate derived from isophorone diisocyanate.

20. The multilayer plastic composite according to claim 13, wherein said compound containing two isocyanate groups (IIb1) comprises a lactam-blocked isocyanate.

21. The multilayer plastic composite according to claim 13, wherein said compound containing more than two isocyanate groups (IIb2) comprises a lactam-blocked isocyanate.

22. The multilayer plastic composite according to claim 13, comprising a plurality of said layer (I).

23. The multilayer plastic composite according to claim 13, comprising a plurality of said layers (II).

24. A molded article, comprising a multilayer plastic composite comprising:
   (I) at least one outer layer based on a polyamide molding composition; and
   (II) at least one layer of a molding composition, comprising:
      (a) from 95 to 99% by weight of a linear, partially crystalline thermoplastic polyester; and
      (b) from 1 to 5% by weight of a mixture, comprising:
         (1) from 30 to 70% by weight of at least one compound containing two isocyanate groups; and
         (2) from 30 to 70% by weight of at least one compound containing more than two isocyanate groups;
wherein the isocyanate groups originating from component (IIb) are present in layer (II) in a concentration of between 0.03 and 0.3% by weight, and said layers (I) and (II) are adhesively bonded to one another.

25. The article of claim 24, which is a filling nozzle or a fuel tank for a motor vehicle.

* * * * *